(12) United States Patent
Aggarwal et al.

(10) Patent No.: US 11,544,089 B2
(45) Date of Patent: *Jan. 3, 2023

(54) INITIALIZING A CONVERSATION WITH AN AUTOMATED AGENT VIA SELECTABLE GRAPHICAL ELEMENT

(71) Applicant: GOOGLE LLC, Mountain View, CA (US)

(72) Inventors: Vikram Aggarwal, Palo Alto, CA (US); Dina Elhaddad, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,049

(22) Filed: Oct. 18, 2021

(65) Prior Publication Data

US 2022/0035643 A1  Feb. 3, 2022

Related U.S. Application Data

(63) Continuation of application No. 15/497,088, filed on Apr. 25, 2017, now Pat. No. 11,150,922.

(51) Int. Cl.
*G06F 3/0488* (2022.01)
*G06F 3/16* (2006.01)
(Continued)

(52) U.S. Cl.
CPC ............ *G06F 9/453* (2018.02); *G06F 3/0488* (2013.01); *G06F 3/04812* (2013.01);
(Continued)

(58) Field of Classification Search
CPC .... G06F 9/453; G06F 3/04812; G06F 3/0488; G06F 3/167; G06F 3/0484;
(Continued)

(56) References Cited

U.S. PATENT DOCUMENTS 8,995,972 B1   3/2015   Cronin
9,294,476 B1   3/2016   Lurey et al.
(Continued)

FOREIGN PATENT DOCUMENTS

JP    H03191757    8/1991
JP    201097332    4/2010
(Continued)

OTHER PUBLICATIONS

Korean Intellectual Property Office; Allowance of Patent issued in Application No. 10-2022-7000858; 3 pages; dated May 2, 2022.
(Continued)

*Primary Examiner* — Kieu D Vu
*Assistant Examiner* — Rami R Okasha
(74) *Attorney, Agent, or Firm* — Middleton Reutlinger

(57) ABSTRACT

Methods, apparatus, systems, and computer-readable media are provided for using selectable elements to invoke an automated assistant at a computing device. While operating the computing device, a user may not be aware that the automated assistant can be invoked according to certain invocation phrases. In order to inform the user of the functionality of the automated assistant, the user can be presented with selectable elements that can initialize the automated assistant when selected. Furthermore, a selectable element can provide an invocation phrase in textual form so that the user is aware of their ability to invoke the automated assistant by speaking the invocation phrase. The selectable element can be presented at different devices associated with the user, and the automated assistant can be initialized at a device that is separate from the device where the selectable element is presented.

20 Claims, 11 Drawing Sheets

(51) Int. Cl.
*G10L 15/30* (2013.01)
*G06F 9/451* (2018.01)
*G10L 15/18* (2013.01)
*G06F 3/04812* (2022.01)

(52) U.S. Cl.
CPC .......... *G06F 3/167* (2013.01); *G10L 15/1822* (2013.01); *G10L 15/30* (2013.01)

(58) Field of Classification Search
CPC ............... G06F 3/04817; G06F 3/0482; G10L 15/1822; G10L 15/30
See application file for complete search history.

(56) References Cited

U.S. PATENT DOCUMENTS

| | | |
|---|---|---|
| 10,185,542 B2 | 1/2019 | Carson et al. |
| 2012/0042343 A1 | 2/2012 | Laligand et al. |
| 2012/0253788 A1 | 10/2012 | Heck et al. |
| 2013/0080525 A1 | 3/2013 | Aoki et al. |
| 2013/0185336 A1 | 7/2013 | Singh et al. |
| 2013/0275138 A1 | 10/2013 | Gruber et al. |
| 2013/0332172 A1 | 12/2013 | Prakash et al. |
| 2013/0332632 A1 | 12/2013 | Rathi et al. |
| 2014/0006947 A1 | 1/2014 | Garmark et al. |
| 2014/0218372 A1 | 8/2014 | Missig et al. |
| 2014/0272821 A1 | 9/2014 | Pitschel et al. |
| 2014/0278444 A1 | 9/2014 | Larson et al. |
| 2014/0317502 A1 | 10/2014 | Brown et al. |
| 2014/0365885 A1 | 12/2014 | Carson et al. |
| 2015/0053780 A1 | 2/2015 | Nelson et al. |
| 2015/0254057 A1 | 9/2015 | Klein et al. |
| 2015/0348554 A1 | 12/2015 | Orr et al. |
| 2015/0372746 A1 | 12/2015 | Xie et al. |
| 2015/0382047 A1 | 12/2015 | Van Os et al. |
| 2016/0070580 A1 | 3/2016 | Johnson et al. |
| 2016/0118048 A1 | 4/2016 | Heide |
| 2016/0212488 A1 | 7/2016 | Os et al. |
| 2016/0259656 A1 | 9/2016 | Sumner et al. |
| 2016/0323389 A1 | 11/2016 | Miller |
| 2017/0068423 A1 | 3/2017 | Napolitano et al. |
| 2017/0308248 A1 | 10/2017 | Choi et al. |
| 2017/0357478 A1 | 12/2017 | Piersol et al. |
| 2017/0357637 A1 | 12/2017 | Nell et al. |
| 2018/0082683 A1 | 3/2018 | Chen et al. |
| 2018/0189078 A1 | 7/2018 | Wadley et al. |
| 2018/0204569 A1 | 7/2018 | Nadkar et al. |
| 2019/0095171 A1 | 3/2019 | Carson et al. |

FOREIGN PATENT DOCUMENTS

| | | |
|---|---|---|
| JP | 2016522926 | 8/2016 |
| WO | 2014176354 | 10/2014 |

OTHER PUBLICATIONS

The Korean Intellectual Property Office; Notice of Office Action issued in Application No. 10-2022-7000858; 6 pages; dated Feb. 10, 2022.

European Patent Office; Summons to Attend Oral Proceedings pursuant to Rule 115(1) issued in Application No. 18721890.4, 11 pages, dated Apr. 29, 2022.

Japanese Patent Office; Pre-Appeal Examination Report issued in Application No. 2019-557847; 7 pages dated Dec. 7, 2021.

Korean Patent Office; Notice of Allowance issued in Application No. 1020197033711; 3 pages; dated Nov. 5, 2021.

Japanese Patent Office; Decision of Rejection issue in Application No. 2019557847; 6 pages; dated Jun. 7, 2021.

Japanese Patent Office; Notice of Reasons for Rejection issue in Application No. 2019557847; 7 pages; dated Jan. 12, 2021.

European Patent Office; Communication Pursuant Article 94(3) EPC issue in Application No. 18721890.4; 8 pages; dated Dec. 1, 2020.

International Search Report and Written Opinion of PCT Ser. No. PCT/US2018/025303; 11 pages, dated Jul. 4, 2018.

European Patent Office; Preliminary Opinion issued in Application No. 18721890.4, 6 pages, dated Oct. 18, 2022.

INITIALIZING A CONVERSATION WITH AN AUTOMATED AGENT VIA SELECTABLE GRAPHICAL ELEMENT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances), which may in some cases be converted into text and then processed. In this way, a user has the ability to invoke functions of a computing device without requiring the user to necessarily physically manipulate a peripheral device such as a keyboard or mouse. Such automated assistants can be responsive to spoken phrases that are preloaded on a computing device and spoken by the user. Oftentimes however, the user may not be aware of the variety of speakable phrases available to invoke an automated assistant, or may not be able to pronounce such speakable phrases. Furthermore, because of the expanding range of functions possessed by many computing devices, most users may not have any convenient resource for learning the totality of available functions. As a result, users may miss out on many serviceable features of automated assistants. Furthermore, certain environments may be too noisy for speaking out a query comfortably, and a user may choose to not speak out queries at certain times in order to preserve their privacy, for example, at work or in a café.

SUMMARY

The present disclosure is generally directed to methods, apparatus, and computer-readable media (transitory and non-transitory) for introducing users to functions of automated assistants by providing selectable elements associated with invocation phrases. The selectable elements can transition an automated assistant into a particular operating state, such as a state in which the automated assistant initializes and/or completes a service request (e.g., "call me a cab to the airport")—without requiring the user to first audibly solicit the automated assistant.

The selectable element (e.g., a textual or graphical hyperlink) can be provided at a graphical user interface ("GUI") of a mobile device as the user is, for example, browsing a web page, viewing an email, operating a miscellaneous application, etc. Suppose a user navigates a web browser to a web page that corresponds to a nearby store. A link or other selectable element on the webpage can display an invocation phrase such as "please give me directions to this nearby store." By clicking the link, an automated assistant can be initialized (typically but not exclusively on another computing device) to provide an audible response that will encourage the user to continue a conversation with the automated assistant. Thereafter, the user need not rely on a link, but can rather initiate the automated assistant using the invocation phrase previously introduced to them in the selectable element.

In some implementations, a user may be shown a selectable element on a first device. In response to the user selecting the selectable element, an automated assistant on a second device can transition into a particular operating state. This encourages the user to initiate automated assistants on other devices, which they may have not realized had the capacity to invoke an automated assistant. Furthermore, some implementations can handle multiple languages. For example, the selectable element can include an invocation phrase in a preferred language of a user, making the user aware that they are free to use their language of preference to invoke an automated assistant, despite other features of their device displaying in a less familiar language. Alternatively, the selectable element can include an invocation phrase in the preferred language of the user (e.g., as translated by the user's local web browser), but in response to selecting the selectable element, the automated assistant can instruct the user how to pronounce the invocation phrase (e.g., a "canonical" invocation phrase) in a language that is more familiar to the automated assistant.

In some implementations, applications operating on a third party device (e.g., a third party cellular device) can provide selectable elements that include an invocation phrase for invoking an automated assistant on another device. In this scenario, the user will be introduced to the ability of the automated assistant to be invoked based on content viewed at the third party device. For example, a user can compile a playlist on an application of a third party device, and the application can present a selectable element with the invocation phrase "please play the playlist I just compiled." Upon clicking the selectable element, an automated assistant can be initialized on a separate device that is more suitable for playing music than the third party device. Alternatively, if another device is not available, a web application corresponding to the automated assistant can be initialized at the third party device. In this way, the user can be made aware of the ability to invoke an automated assistant to utilize content being viewed at a third party device.

In yet other implementations, the invocation phrases included in the selectable elements can be adapted over time based on learned preferences and trends of the user. As a result, the user will be made aware that they can speak more specific phrases to invoke the automated assistant, as opposed to making duplicative general requests. For example, a user may solicit the automated assistant to play music from a playlist. However, if an artist on the playlist is played more than others (e.g., Led Zeppelin), the user can be presented with a selectable element that includes the invocation phrase "please play Led Zeppelin." In this way, by adapting the invocation phrase of the selectable element, the user can be made aware that the automated assistant understands more specific requests. As another example, a user may have a home assistant device (e.g., a standalone interactive speaker) that can tell when the user arrives home from work everyday. When the user arrives home each day, the user may always ask the home assistant device to continue playing a podcast that the user was listening to in the car. However, in order to eliminate the need for the user to repeatedly make this request, a selectable element can be provided at a user interface of the car with the invocation phrase "assistant, whenever I arrive home listening to a podcast, continue playing the podcast inside my home." When the user selects the selectable element at the user interface, the home assistant device can continue playing the podcast and, optionally, audibly acknowledge that a new automation rule has been established. In this way, capabilities of the automation assistant can be shown to the user by adapting invocation phrases in the selectable elements according to learned preferences of the user.

In some embodiments, responsive elements can be provided with a new phrase to guide the user in their responses after an initial selectable element was selected and an automated assistant was initialized. By providing the responsive elements, the user can be made aware of audible responses the automated assistant will understand. Furthermore, the responsive elements can illustrate response phrases with placeholders that the user can fill in when responding to the automated assistant. For example, the user can be presented with a selectable element having the invocation phrase "please set an alarm for tomorrow morning" after the user has scheduled an early meeting in their calendar for the next morning. Selecting the selectable element can initialize the automated assistant and cause the automated assistant to audibly query the user with the phrase "Ok, what time would you like the alarm set for?" If the user does not audibly respond after a threshold period of time, a responsive element can then be presented to the user with the response phrase "please set the alarm for [say the time for the alarm here]." The responsive element can optionally be selectable or unselectable. Presenting available responses in this way can ensure that the user will always have some amount of visual guidance when they are not sure of how to respond to the automated assistant.

Therefore, in some implementations, a method can include steps such as: receiving, by a computing device from a server device, instructions for providing a selectable element at a graphical user interface of the computing device. The selectable element can be associated with an invocation phrase that, when spoken, transitions an automated assistant into an operating state in which the automated assistant causes output to be provided on a separate computing device. The method can also include steps of displaying the selectable element on the graphical user interface of the computing device, and receiving, at the graphical user interface, a selection of the selectable element. The method can further include a step of causing, in response to receiving the selection, the automated assistant to transition into the operating state to cause the separate computing device to provide the output.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

As used herein, an "agent" references one or more computing devices and/or software that is separate from an automated assistant. In some situations, an agent may be a third-party (3P) agent, in that it is managed by a party that is separate from a party that manages the automated assistant. The agent is configured to receive (e.g., over a network and/or via an API) an invocation request from the automated assistant. In response to receiving the invocation request, the agent generates responsive content based on the invocation request, and transmits the responsive content for the provision of output that is based on the responsive content. For example, the agent may transmit the responsive content to the automated assistant for provision of output, by the automated assistant, that is based on the responsive content.

As another example, the agent can itself provide the output. For instance, the user can interact with the automated assistant via a client device (e.g., the automated assistant can be implemented on the client device and/or in network communication with the client device) and the agent can be an application installed on the client device or an application executable remote from the client device, but "streamable" on the client device. When the application is invoked, it can be executed by the client device and/or brought to the forefront by the client device (e.g., its content can take over a display of the client device).

Invoking an agent can include transmitting (e.g., utilizing an application programming interface (API)) an invocation request that includes value(s) for invocation parameter(s) (e.g., a value for an intent parameter, value(s) for intent slot parameter(s), and/or value(s) for other parameter(s)), and that causes the agent to generate content for presentation to the user via one or more user interface output devices (e.g., via one or more of the user interface output devices utilized in the dialog with the automated assistant). The responsive content generated by the agent can be tailored to the invocation parameters of the invocation request.

BRIEF DESCRIPTION OF THE DRAWINGS

FIG. 2A, FIG. 2B, and FIG. 2C illustrate an implementation of a selectable element that can initialize an automated assistant for providing a service to a user.

DETAILED DESCRIPTION

Figure 1:
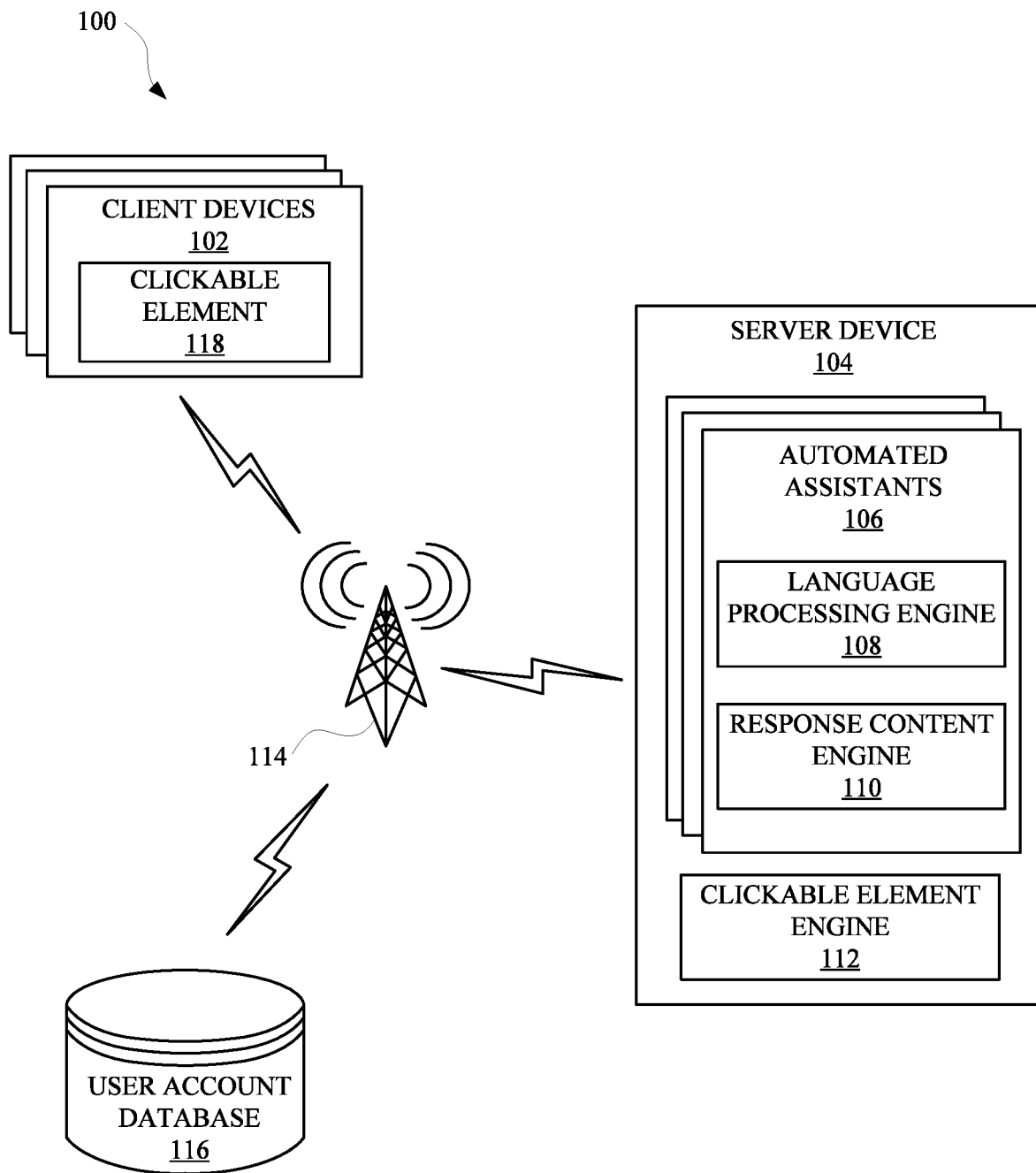
FIG. 1 illustrates a system for initializing an automated assistant using a selectable element displayed at a client device.

The implementations described herein relate to systems, methods, and apparatuses for introducing novice users to functions of automated assistants by providing selectable elements that convey invocation phrases to initialize service requests for an automated assistant without requiring the user to first audibly solicit the automated assistant. In many computing devices, automated assistants can provide guidance to users that are seeking to use some digital service. Although automated assistants can be invoked by certain spoken phrases, oftentimes a user may not be familiar with all of the phrases and their functionality. Furthermore, a user may know what they want the automated assistant to do, but they may not be able to accurately pronounce the words involved with making a command or realize that the automated assistant does or does not accept a preferred language of the user. In order to introduce the user to certain capabilities of automated assistants, selectable elements that convey invocation phrases can be presented to the user to make the user aware of the commands that are accepted by the automated assistant without having to first speak them. When the user physically actuates (e.g., clicks) the selectable element that conveys the invocation phrase, the automated assistant can be initialized and audibly respond as if the user spoke the invocation phrase.

The selectable element (e.g., a textual or graphical hyperlink) can be provided at a graphical user interface (GUI) of a mobile device as the user is, for example, browsing a web page, viewing an email, operating a miscellaneous application, etc. Suppose a user navigates a web browser to a web page that corresponds to a nearby store. A link or other selectable element on the webpage can display an invocation phrase such as "please give me directions to this nearby store." By clicking the link, an automated assistant can be initialized to provide an audible response that will encourage the user to continue a conversation with the automated assistant. Thereafter, the user need not rely on a link, but rather initiate the automated assistant using the invocation phrase previously introduced to them in the selectable element.

In some implementations, a user may be shown a selectable element on a first device. In response to the user selecting the selectable element, an automated assistant on a second device can transition into a particular operating state in which it provides output. This encourages the user to initiate automated assistants on other devices, which they may not have realized had the capacity to invoke an automated assistant. Furthermore, some implementations can handle multiple languages. For example, the selectable element can include an invocation phrase in a preferred language of a user, making the user aware that they are free to use their language of preference to invoke an automated assistant, despite other features of their device displaying in a less familiar language. Alternatively, the selectable element can include an invocation phrase in the preferred language of the user, but in response to selecting the selectable element, the automated assistant can instruct the user how to recite a so-called "canonical" version of invocation phrase in a language that is more familiar to the automated assistant.

In order to provide selectable elements that are suitable for a given context, a system of devices can be tasked with managing the introduction of automated assistants to a user. The system of devices can include at least a server that can access an account database and one or more assistant (or client) devices. An assistant (or client) device can be used to present the user with the selectable element that conveys the invocation phrase for invoking an automated assistant at a particular assistant device. The server can use login credentials from the assistant device to query the account database and identify any other assistant devices that are associated with the login credentials. For example, a user's login credentials may be associated with a user account that is activated on a coordinated "ecosystem" of assistant (or client) devices operated by the user. Thereafter, in response to the user selecting the clickable invocation phrase, the server can identify a suitable assistant device from the assistant devices associated with the login credentials. The assistant device identified by the server can be one that is determined to be most suitable for performing the action associated with the clickable invocation phrase. For example, a cellular phone can be a more appropriate assistant device for giving directions than a television because the cellular phone can be more readily carried during a trip than a television. Once an assistant device has been identified by the server, the server can send instructions to the assistant device regarding how to respond to a command conveyed by the selectable element. The response from the assistant device can be an audible response, in order to encourage audible exchanges between the user and the assistant device. The response from the assistant device can also include a change at an interface of the assistant device. For example, when a user clicks on a selectable element corresponding to a request for directions, an assistant device can respond by displaying a route and speaking a response phrase such as "here are the directions you requested." The assistant device can also respond with a question for the user, in order to encourage the user to respond with their voice.

Responses can be based on data stored at the server of the system. The server can include modules for operating one or more automated assistants, and preloaded invocation phrases and responses that each automated assistant can use. The server can select the appropriate automated assistant according to the assistant device being used by the user, the content being viewed by the user, the selectable element actuated by the user, and/or any other feature related to an operating environment of an assistant device. For example, the server can include modules corresponding to automated assistants that provide assistance in different languages, and the selection of an automated assistant can be based on a language of the selectable element.

Selectable elements can be shown to users that are logged into an assistant device where an assistant service is enabled. However, the deployment of a selectable element can be limited to certain circumstances. For example, the display of a selectable element can depend on the content being viewed by a user and the type of assistant device being used by the user. A user that is streaming video on their cellular phone while away from their home may not be shown an invocation phrase for streaming content on their home television until they are more proximate to the television. Once the user is home, a selectable element that conveys information such as "please play this video on my television" can be displayed at their cellular phone. Upon actuating on the selectable element, the television can play the video and also provide an audible response such as "here is the video you requested." In some implementations, the device that is presenting the selectable element can display an image of a device to be initialized. For example, the selectable element that provides the phrase "please play this video" at the cellular phone can also include an icon representing the television. A server can identify the appropriate icon to display according to which device is most suitable for initialization by the selectable element. For example, a selectable element that includes the phrase "please call Sally" can incorporate an icon representing a cellular phone when the user has been known by the server to make most phone calls from their cellular phone. Additionally, a selectable element that includes the phrase "please file my taxes" can incorporate an icon representing a laptop computer when the server is aware of a tax application or a website that is active on the laptop computer of the user.

In some implementations, applications operating on a third party device (e.g., a third party cellular device) can provide selectable elements that include an invocation phrase for invoking an automated assistant on another device. In this scenario, the user will be introduced to the ability of the automated assistant to be invoked based on content viewed at the third party device. For example, a user can compile a playlist on an application of a third party device, and the application can present a selectable element with the invocation phrase "please play the playlist I just compiled." Upon clicking the selectable element, an automated assistant can be initialized on a separate device that is more suitable for playing music than the third party device. Alternatively, if another device is not available, a web application corresponding to the automated assistant can be initialized at the third party device. In this way, the user can be made aware of the ability to invoke an automated assistant to utilize content being viewed at a third party device.

In yet other implementations, the invocation phrases included in the selectable elements can be adapted over time based on learned preferences and trends of the user. As a result, the user will be made aware that they can speak more specific phrases to invoke the automated assistant, as opposed to making duplicative general requests. For example, a user may solicit the automated assistant to play music from a playlist. However, if an artist on the playlist is played more than others (e.g., Led Zeppelin), the user can be presented with a selectable element that includes the invocation phrase "please play Led Zeppelin." In this way, by adapting the invocation phrase of the selectable element, the user can be made aware that the automated assistant understands more specific requests. As another example, a user may have a standalone interactive speaker operating an automated assistant that can tell when the user arrives home from work every day. When the user arrives home each day, the user may always ask the standalone interactive speaker to continue playing a podcast that the user was listening to in the car. However, in order to eliminate the need for the user to repeatedly make this request, a selectable element can be provided at a GUI of a vehicle navigation system in the car with the invocation phrase "assistant, whenever I arrive home listening to a podcast, continue playing the podcast inside my home." When the user selects the selectable element at the GUI, the standalone interactive speaker can continue playing the podcast and, optionally, audibly acknowledge that a new automation rule has been established. In this way, capabilities of the automated assistant can be shown to the user by adapting invocation phrases in the selectable elements according to learned preferences of the user.

In some embodiments, responsive elements can be provided with a new phrase to guide the user in their responses after an initial selectable element was selected and an automated assistant was initialized. By providing the responsive elements, the user can be made aware of audible responses the automated assistant will understand. Furthermore, the responsive elements can illustrate response phrases with placeholders that the user can fill in when responding to the automated assistant. For example, the user can be presented with a selectable element having the invocation phrase "please set an alarm for tomorrow morning" after the user has scheduled an early meeting in their calendar for the next morning. Selecting the selectable element can initialize the automated assistant and cause the automated assistant to audibly query the user with the phrase "Ok, what time would you like the alarm set for?" If the user does not audibly respond after a threshold period of time, a responsive element can then be presented to the user with the response phrase "please set the alarm for [say the time for the alarm here]." The responsive element can optionally be a selectable element. Presenting available responses in this way can ensure that the user will always have some amount of visual guidance when they are not sure of how to respond to the automated assistant.

FIG. 1 illustrates a system 100 for initializing an automated assistant 106 using a selectable element 118 displayed at a client device 106. Each of the client devices 106 can be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), or a wearable apparatus of the participant that includes a computing device (e.g., a watch of the participant having a computing device, glasses of the participant having a computing device). Additional and/or alternative client devices 106 can be provided. The server device 104, and/or an automated assistant 106 on the server device 104, can be implemented in one or more computers that communicate, for example, through a network 114. A user can interact with server device 104 via a client device 102. Each client device 106 can be a computer system coupled to the server device 104 through one or more networks 114 such as a local area network (LAN) or wide area network (WAN) such as the Internet.

A user account database 116 can be connected to server device 104 and/or client devices 102 via the network 114. In this specification, the term "database" will be used broadly to refer to any collection of data. The data of the database can be structured in any particular way and the data can be stored on storage devices in one or more geographic locations. Thus, for example, the user account database 116 can include multiple collections of data, each of which can be organized and accessed differently.

A user of the client device 102 can operate one or more software applications (not depicted) on the client device 102 to perform tasks such as recording data, accessing media, controlling another client device 102, and/or any other task suitable for a computer system. While operating the client device 102, the user can solicit an automated assistant 106 in various ways, such as speaking, moving extremities, moving an object, inputting text and/or images into a messaging application (e.g., SMS, MMS, instant messaging, chat, etc.) in which automated assistant 106 is accessible and/or a participant, and so forth. However, when a user is not aware of their ability to solicit an automated assistant 106 in certain scenarios, the selectable element 118 can be provided to the user at a graphical user interface (GUI) of the client device 102. The selectable element 118 can be a graphical feature (e.g., a link, image, button, card, pop-up notification, etc.) provided at the GUI that causes the client device 102 to interact with the server device 104 when the selectable element 118 is selected. The selectable element 118 can include content such as, for example: text, images, videos, sounds, embedded information (e.g., meta information and/or hyperlinks); and/or embedded instructions (e.g., ECMAScript implementations such as JavaScript).

In order to provide the selectable element 118 at the GUI of the client device 102, in some implementations, account data (e.g., login credentials or a user identifier) can be provided over the network 114 from the client device 102 to the server device 104. The server device 104 can use the account data to query the user account database 116. The server device 104 can identify, in the user account database 116, information associated with an account of the user, such as, for example, devices associated with the account (e.g., the coordinated ecosystem of device mentioned previously), preferences of the user, a learned schedule of the user, contacts of the user, media viewed at a device of the user, and/or any other data that can be stored in association with an account of a user. The server device 104 can use the information from the user account database 116 to make decisions regarding how to provide the selectable element 118 to the client device 102 and how the automated assistant 106 can respond to a selection of a selectable element 118. While service device 104 and user account database 116 are depicted separately in FIG. 1, this is not meant to be limiting, and these components may be implemented on the same computing system and/or distributed across multiple computing systems in various ways.

Operations of one or more automated assistants 106 can be performed according to data stored at the server device 104. In some implementations, a user account can be associated with one or more different automated assistants 106, and each automated assistant 106 can provide similar or different services to a user. In other implementations, a user account may be associated with a single automated assistant 106 or agent, and/or a single automated assistant 106 may service or interact with multiple user accounts and/or agents (in some such cases, the automated assistant 106 may have access to different data depending on which user account or agent it is currently servicing). For example, a response from a user to an automated assistant 106 can be processed by the automated assistant 106 and transmitted to one or more agents for providing a service to the user. Automated assistant 106 can include, or operate according to, a (natural) language processing engine 108 that can receive audio data corresponding to spoken words of a user and convert the audio data into received language data. The received language data can correspond to a command (e.g., natural language input) that can cause the automated assistant 106 to act on the command. For example, the automated assistant 106 can perform various actions in response to receiving the command from the user such as providing information to the user, controlling a device associated with the user, editing data stored in association with an account of the user, and/or any other action capable of being performed by a computer system. The automated assistant 106 can also cause the client device 102 to provide an audible response before, during, and/or after the automated assistant 106 performs an operation. The response from the automated assistant 106 can be generated by a response content engine 110 of the automated assistant 106. The response content engine 110 can use data from the server device 104, client device 102, and/or user account database 116 to provide responses when a user is communicating with an automated assistant 106. Additionally, the data used by the response content engine 110 can be from data sources that are not associated with an account of the user (e.g., general Internet searches, miscellaneous web services, etc.). Although responses generated by the response content engine 110 can be audible responses (e.g., spoken words) to be output by the automated assistant 106, responses can also be non-audible (e.g., images, text, video, tactile feedback). For example, a response to a user soliciting an automated assistant 106 can be in the form of text or a selectable element 118 that appears at a GUI of the client device 102.

The server device 104 can include a selectable element engine 112 for generating the contents and data related to the presentation and operation of a selectable element 118. The contents of the selectable element 118 can be based on data from the user account database 116, one or more client devices 102, the server device 104, and/or any other data source that can provide information for inclusion in a selectable element 118. The selectable element 118 provided by the selectable element engine 112 for the client device 102 can be used to initialize one or more automated assistants 106 to assist the user. The content and operation of the selectable element 118 can be based on how the user is operating their client device 102. For example, the user can be using the client device 102 to perform a function that can otherwise be performed by the automated assistant 106. Data related to the function can be transmitted to the server device 104 over the network 114. The selectable element engine 112 of the server device 104 can use the data related to the function as a basis for generating a selectable element 118 that can initialize the automated assistant 106.

Content of the selectable element 118 can include an invocation phrase that, if audibly spoken by the user to the client device 102, would initialize the automated assistant 106. Data corresponding to the content and operation of the selectable element 118 can be transmitted back to the client device 102 and the client device 102 can display the selectable element 118 at a GUI of the client device 102. When the user selects the selectable element 118, the automated assistant 106 can be initialized and assist with performing the function. In this way, the user can be put on notice of the invocation phrase that can initialize the automated assistant 106 for performing the function. Thereafter, the user would be encouraged to speak the invocation phrase rather than manually perform the function themselves with the client device 102.

Figure 2C:
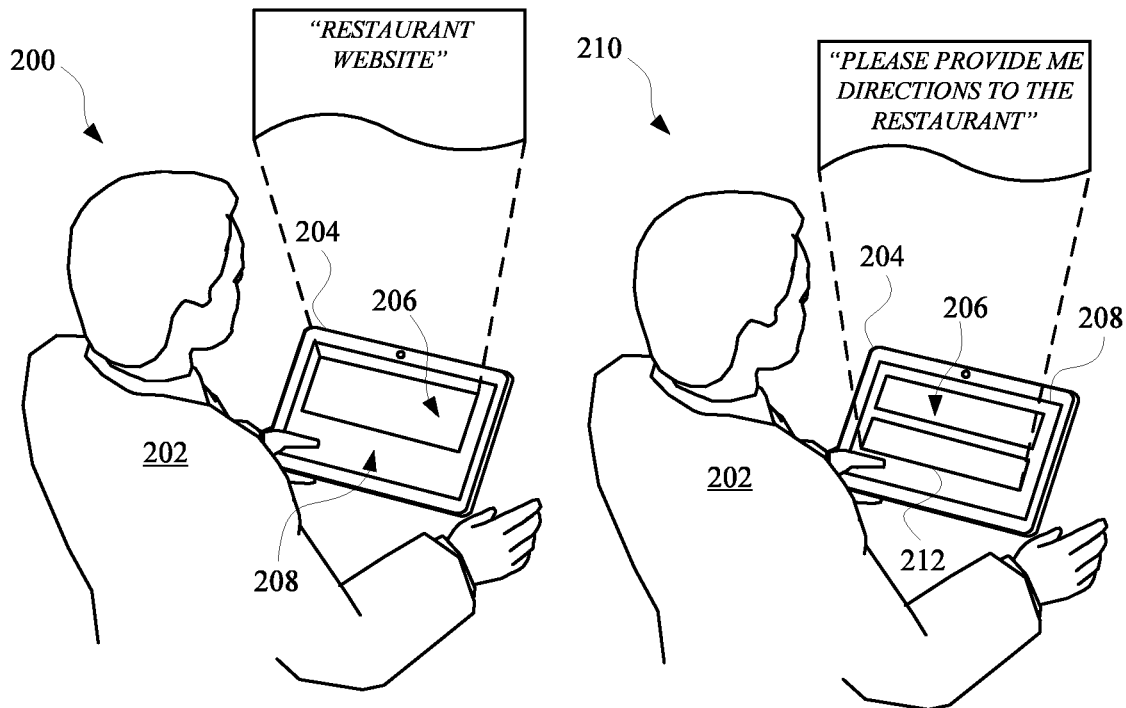
Figure 2C:
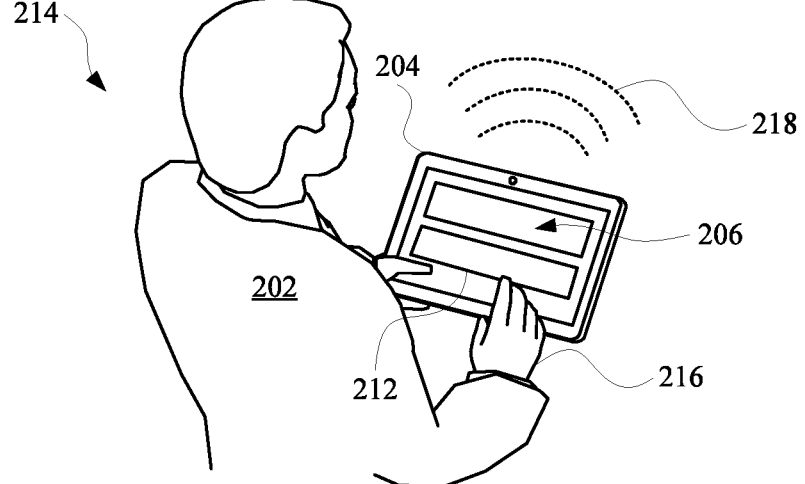

FIGS. 2A-2C illustrate an implementation of a selectable element 212 that can initialize an automated assistant for providing a service to a user 202. Specifically, FIG. 2A illustrates perspective view 200 of the user 202 using an application 206 that is being displayed at a graphical user interface (GUI) 208 of a computer system 204. The application 206 can be a web browser, word processing application, scheduling application, media application, game application, map application, third party application, controller application, email application, messaging application, and/or any other application capable of operating at a computing system. When the application 206 is a web browser, the computer system 204 can transmit account data associated with user 202 to a server that manages the preferences and identifies trends of the user 202. The user 202 can, for example, navigate to a website that identifies a restaurant at which the user 202 would like to eat. Although the user may not realize it, the computer system 204 can initialize an automated assistant that can provide the user 202 with directions to the restaurant. The computer system 204 can initialize the automated assistant in response to the user 202 speaking an invocation phrase at the computer system 204. However, if the user 202 does not speak the invocation phrase or is otherwise not aware of such functionality, a selectable element 212 can be presented at the GUI 208 of the computer system 204 simultaneous to the application 206 being displayed at the GUI 208. The selectable element 212, as shown in perspective view 210 of FIG. 2B, can display text that includes an invocation phrase. The invocation phrase can be based on the media being viewed by the user 202 such as, for example, the website that identifies the restaurant. Instructions for providing the invocation phrase and/or the selectable element 212 can be provided by the computer system 212, a server device that is connected to the computer system 212, and/or any other device capable of controlling and/or hosting an automated assistant. The invocation phrase can be a command such as "please provide me directions to this restaurant." By conveying the invocation phrase in the selectable element 212, the user 202 can be put on notice of the ability to invoke an automated assistant 106 to help find directions. Furthermore, by clicking on the selectable element 212 the user 202 can initiate a conversation with the automated assistant, as illustrated in perspective view 214 of FIG. 2C.

FIG. 2C illustrates an audible output 218 coming from the computer system 204 in response to the user 202 selecting the selectable element 212. The audible output 218 can correspond to speech provided by the automated assistant in response to the user 202 selecting the selectable element 212. By clicking the selectable element 212 the automated assistant receives the invocation phrase as if the user 202 spoke the invocation phrase to the computer system 204. Once the user 202 clicks on the selectable element 212, the selectable element 212 can disappear from the GUI 208 and the application 206 can expand at the GUI 208. The audible output 218 from the automated assistant can provide directions to the user 202 and/or query the user 202 regarding the details of the trip to the restaurant. For example, the automated assistant can ask whether the user 202 will be walking to the restaurant or driving to the restaurant. If the user 202 does not respond to the query after a threshold period of time, another selectable element 212 can be presented with text (e.g., "I would like to walk") for responding to the query from the automated assistant. If selected by the user 202, the other selectable element 212 can cause the automated assistant 106 to provide another audible output 218. For example, if the text of the other selectable element 212 corresponded to the phrase "please give me walking directions to the restaurant," the automated assistant can begin giving walking directions to the user 202 through the computer system 204.

In some implementations, the data that relates to the operation of the automated assistant can be stored at the computer system 204 and/or a server device that is in communications with the computer system 204. Furthermore, when the server device includes the data for operating the automated assistant, the server device can select from different computer systems associated with an account of the user to provide output from the automated assistant. For example, the server device can select the computer system 204 of FIGS. 2A-2C to provide the directions because the server device can know that the computer system 204 is portable and that the user 202 is asking for directions simultaneous to using the computer system 204. Alternatively, if the user 202 is operating an application that has functionality appropriate for a device separate from the computer system 204, the server device or the computer system 204 can select the device for providing an output from the automated assistant. For example, data related to the operation of the automated assistant can be stored at the computer system 204, and the computer system 204 can include a home monitoring application. While the user 202 is operating the home monitoring application, a selectable element can be presented at a home monitoring device. The presentation of the selectable element at the home monitoring device can be based on an action performed at the computer system 204, which can store a directory of devices associated with an account of the user 202. The selectable element can include an invocation phrase that can invoke the automated assistant at the home monitoring device. For example, the invocation phrase can include text such as "please adjust the temperature of the home to 70 degrees." When the user 202 clicks on the selectable element at the home monitoring device, the temperature of the home can be adjusted accordingly, and the automated assistant can provide an audible output from the home monitoring device, such as "I have adjusted the temperature of the home." In some implementations, the text in the invocation phrase can be based on trends and preferences stored by the server device. For example, the text "70 degrees" from the invocation phrase text can be based on a frequency at which the user 202 has previously used the home monitoring application to adjust the temperature to 70 degrees, as stored by the server device and/or the computer system 204.

Figure 3A:
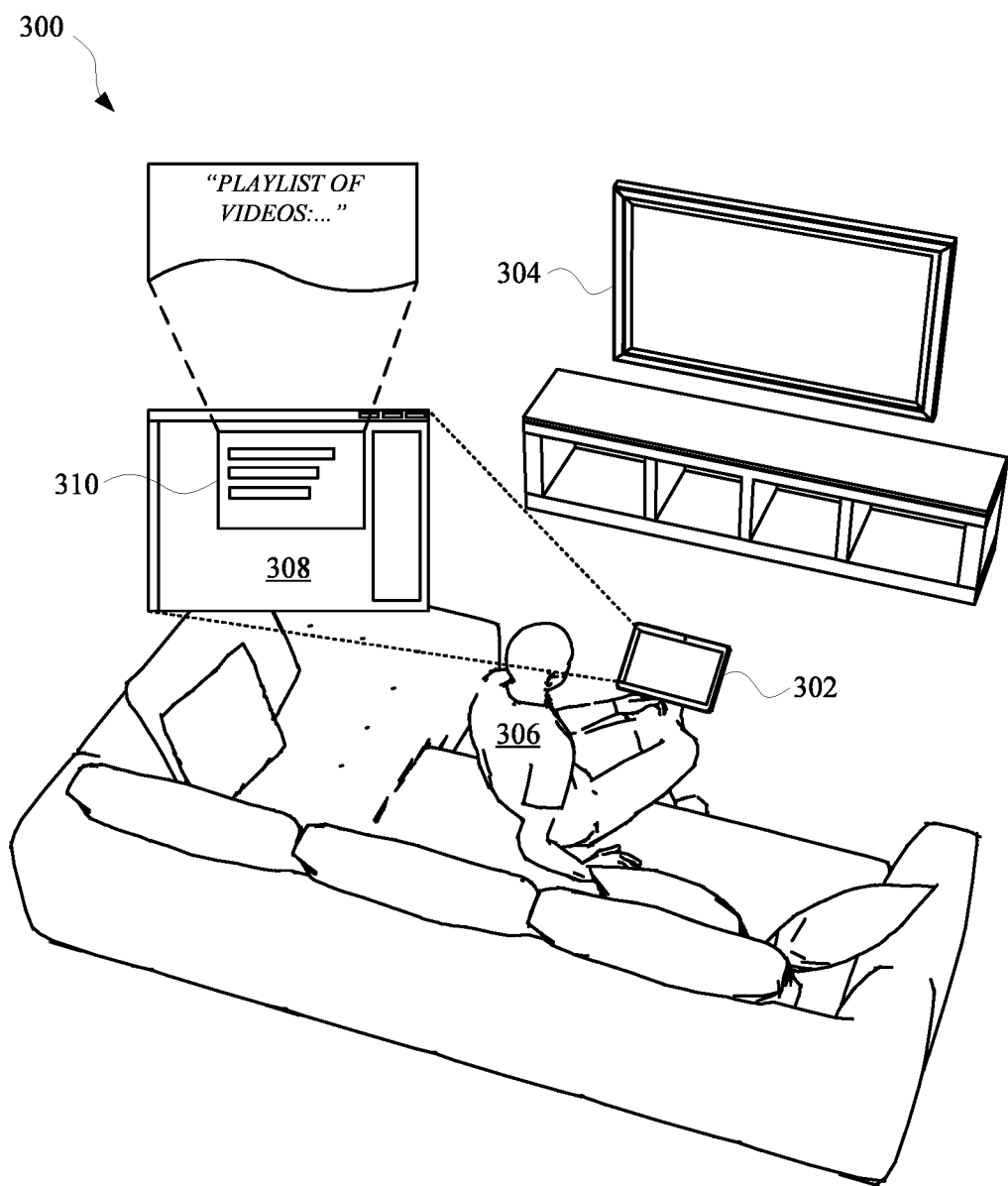
FIG. 3A, FIG. 3B, and FIG. 3C illustrate perspective views of devices that can use a selectable element that is displayed to a user at a first device for initializing an automated assistant at a second device.
Figure 3B:
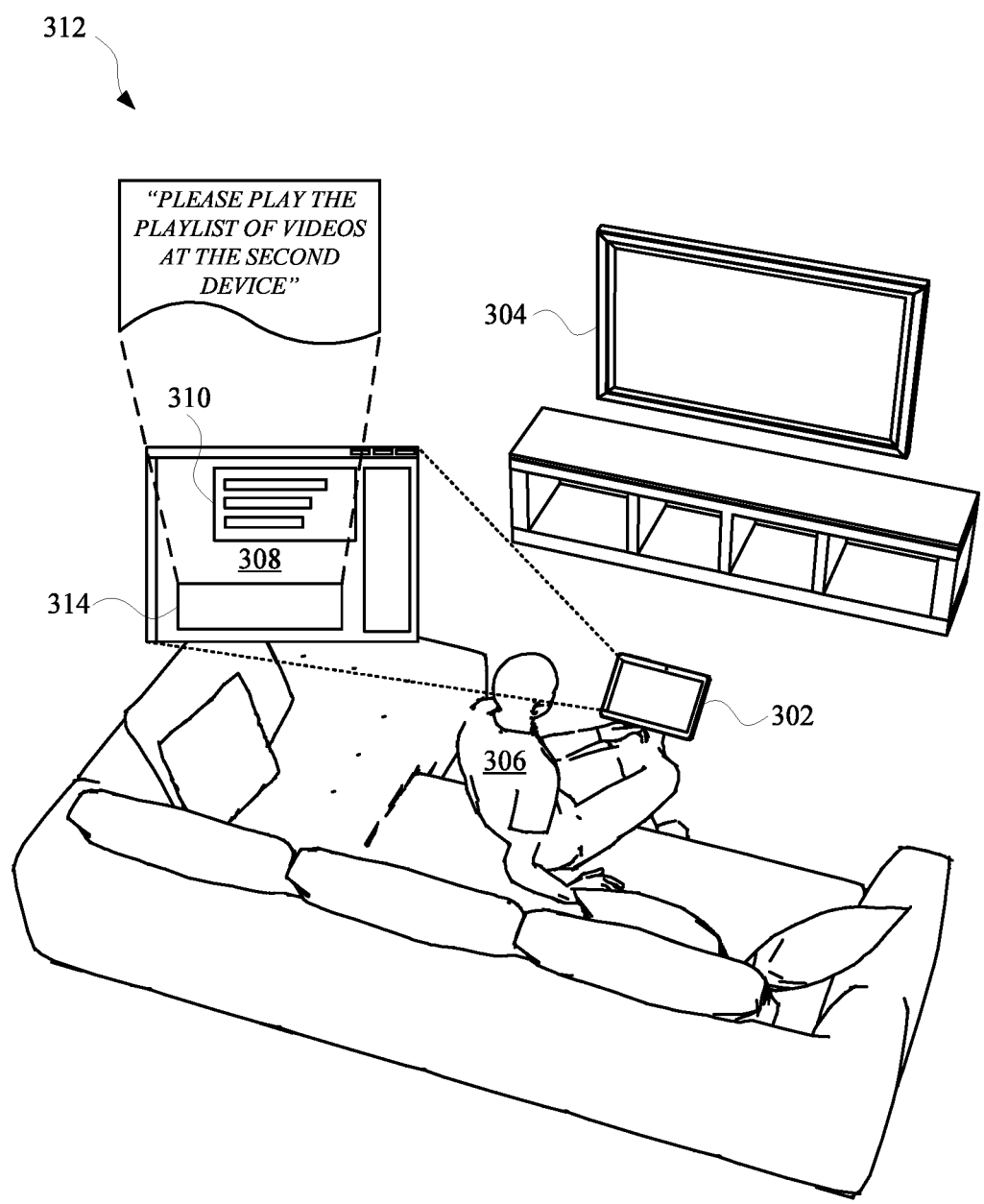
Figure 3C:
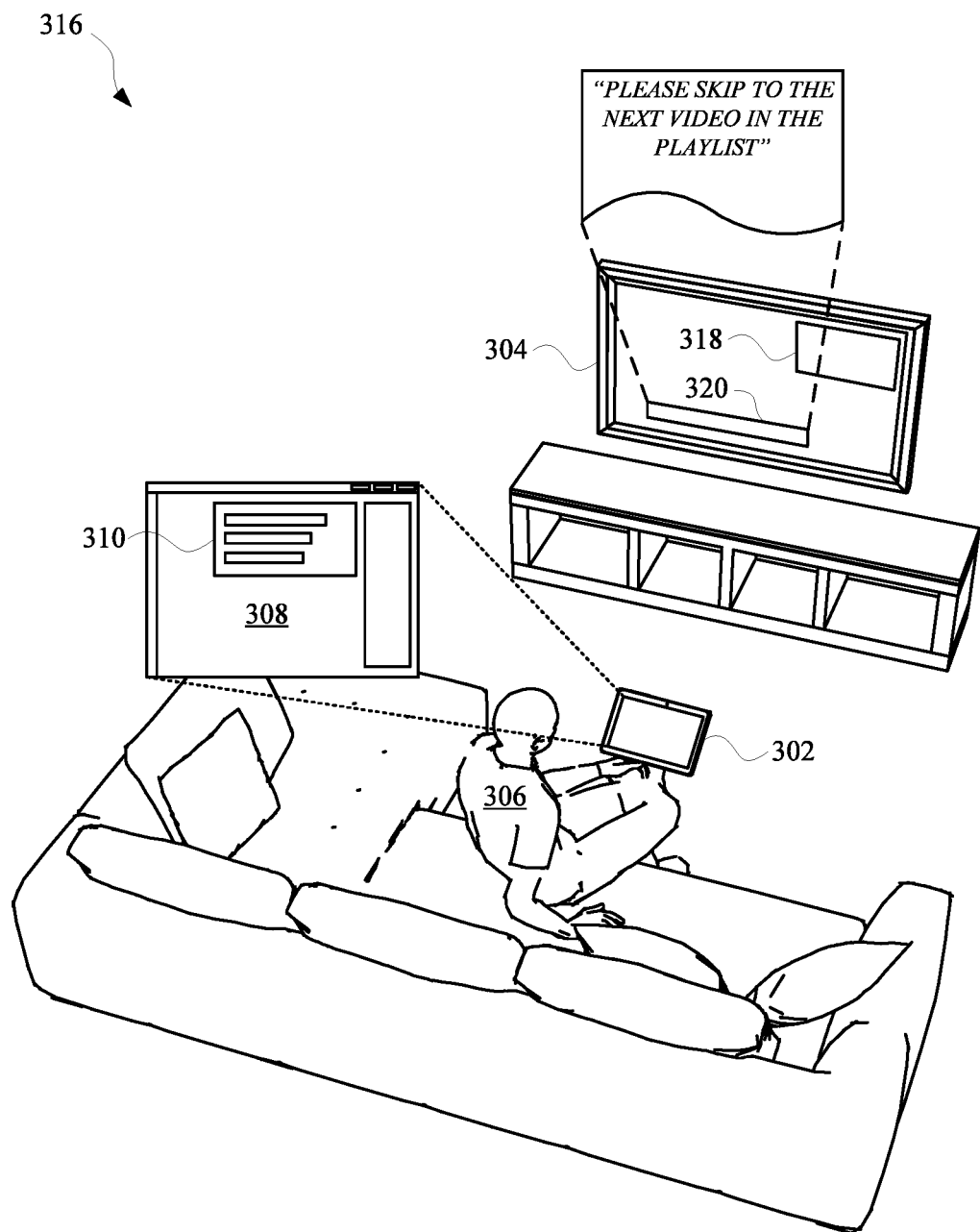

FIGS. 3A-3C illustrate perspective views of devices that can use a selectable element that is displayed to a user 306 at a first device 302 to initialize an automated assistant at a second device 304. Each of the first device 302 and the second device 304 can be computer systems that allow the user 306 to control applications from the computer systems (e.g., members of the aforementioned coordinated ecosystem of computing devices operated by the user 306). Furthermore, the first device 302 and the second device 304 can be connected over a network. While operating the first device 302, the user 202 can be viewing application content 310, which can correspond to any graphical content that can be provided by a graphical user interface (GUI) 308 of a computer system. For example, the application content 310 can be a playlist of videos that the user 306 would like to play inside of their home. Although the user 306 may realize that the second device 304 is capable of playing the playlist of videos, the user 306 may not realize that an automated assistant can operate at the second device 304 to help initiate playback of the playlist. In order to encourage the user 306 to use the automated assistant in this way, a selectable element that includes an invocation phrase can be presented to the user 306 at the first device 302.

The first device 302 can be connected to the second device 304, as well as a network that includes a server device. The user 306 can log into the server device using account data that is provided at the first device 302 and thereafter transmitted to the server device. The server device can use the account data to query a user account database that includes a directory of devices associated with an account of the user 306. The directory of devices can include entries that identify at least the first device 302 and the second device 304. In this way, the server device is able to control where the automated assistant will be initialized from. Because the second device 304 has a larger display area than the first device 302, the server device can select the second device 304 to output videos selected by the user 306 when the second device 304 is accessible to the user 306. Furthermore, as the user 306 is viewing the application content 310 related to the playlist of videos, the server device can provide the first device 302 with data corresponding to the operation and presentation of a selectable element that can initialize the automated assistant. For example, data related to the operation of the selectable element can include instructions executable by the first device 302 or the second device 304 to cause an output of the automated assistant to be provided at the second device 304. Additionally, the data related to the presentation of the selectable element can include the text of an invocation phrase such as "please play the playlist of videos at the second device."

FIG. 3B illustrates perspective view 312 of the user 306 viewing the application content 310 with a selectable element 314 at the GUI 308. The selectable element 314 can be displayed at the GUI 308 with the invocation phrase in order to encourage the user 306 to speak the invocation phrase when they are not aware of certain functions of the automated assistant. In this example, the user 306 is not aware that the automated assistant can be initialized at the second device 304 by speaking the invocation phrase to the second device 304. Therefore, because the server device is informed that the user 306 is viewing application content 310 at the first device 302, the server device can cause the first device 302 to display the selectable element 314. When selected by the user 306, the selectable element 314 can cause the automated assistant to initialize at the second device 304 as if the user 306 audibly spoke the invocation phrase to the second device 304. Additionally, the automated assistant can cause the command corresponding to the invocation phrase to be executed. For example, if the invocation phrase is "please play the playlist of videos at the second device," the automated assistant can cause the second device 304 to display video content 318 corresponding to the videos in the playlist of videos, as illustrated in perspective view 316 of FIG. 3C.

Specifically, FIG. 3C provides a perspective view 316 the user 306 viewing video content 318 displayed at the second device 304 after the user 306 has clicked the selectable element 314 at the first device 302. Optionally, in some implementations, the second device 304 can display an invocation phrase 320 that can inform the user 306 of other features the automated assistant can help with at the second device 304. For example, after the user 306 selects the selectable element 314 and the automated assistant 106 causes the video content 318 to be displayed, the user 306 may want to skip certain videos in the playlist. The skipping function can be performed by the automated assistant at the direction of the user 306. In order to inform the user 306 of this capability, the server device, first device 302, or the second device 304 can cause the invocation phrase 320 to display the text "please skip to the next video in the playlist." Alternatively, the invocation phrase 320 can display the text "please turn up the volume on the videos at the second device 304." Instructions for providing the invocation phrase can be provided to the second device from the server device, or, optionally, the first device 302 or the second device 304. The instructions can optionally be generated by the device that is operating an automated assistant.

In some implementations, the automated assistant can access preferences and trend data related to the user 306 and cause the invocation phrase 320 to include text that is more specific to the trends of the user 306. For example, the automated assistant can access data at the server device that indicates a video (e.g., a Led Zeppelin video) most played by the user 306 is in the playlist of videos. The automated assistant can then cause the invocation phrase 320 or selectable element 314 to display the text "please play the Led Zeppelin video." In this way, the user 306 can be put on notice that they can provide more specific requests to the first device 302 and the second device 304 for invoking the automated assistant. In some implementations, the invocation phrase 320 can be part of a graphical element that is clickable or unclickable. For example, in some implementations, the graphical element with the invocation phrase 320 can be unclickable in order to encourage the user 306 to speak the invocation phrase 320 to the second device 304.

Figure 4A:
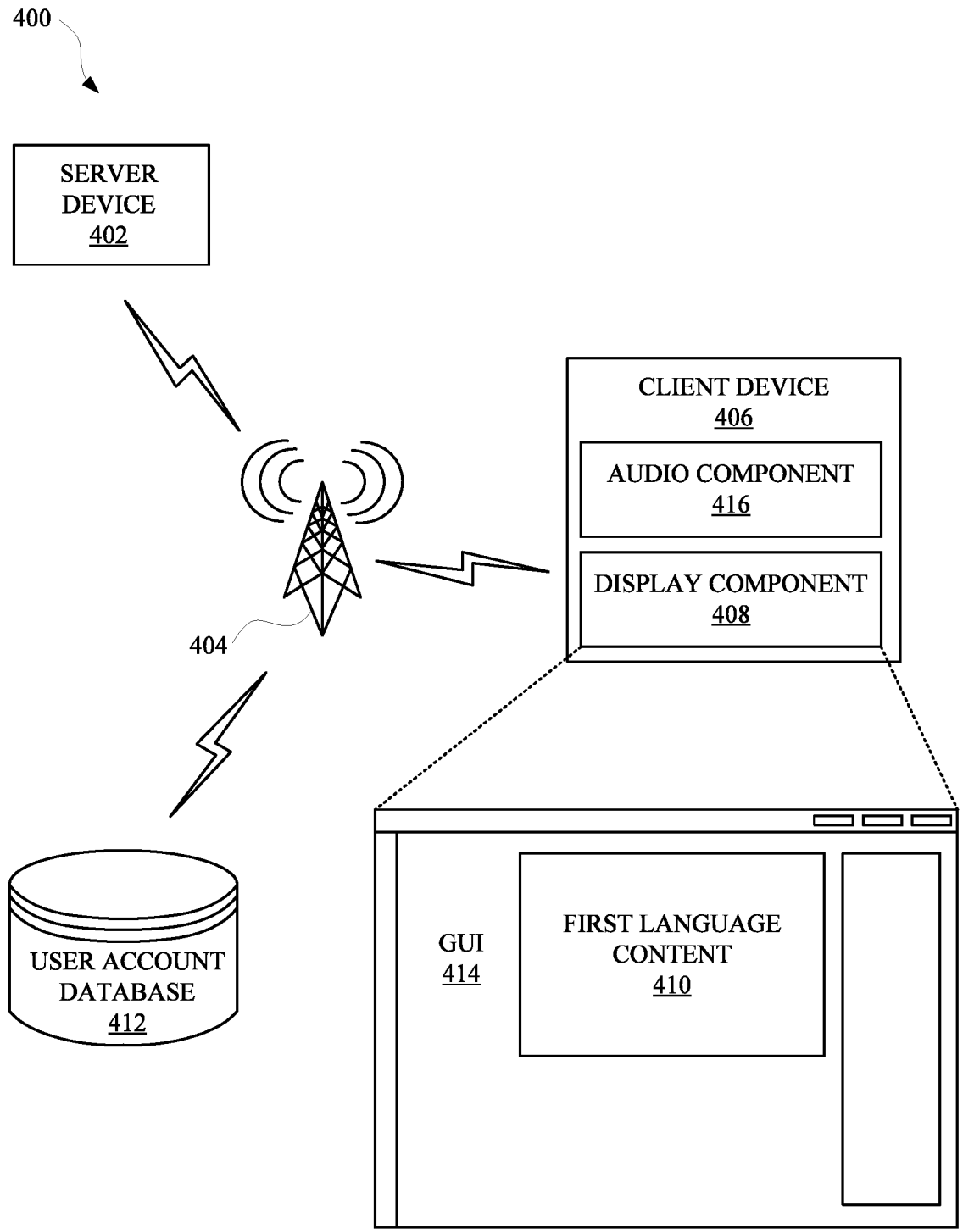
FIG. 4A and FIG. 4B illustrate systems for providing selectable elements that can invoke automated assistants in different languages.
Figure 4B:
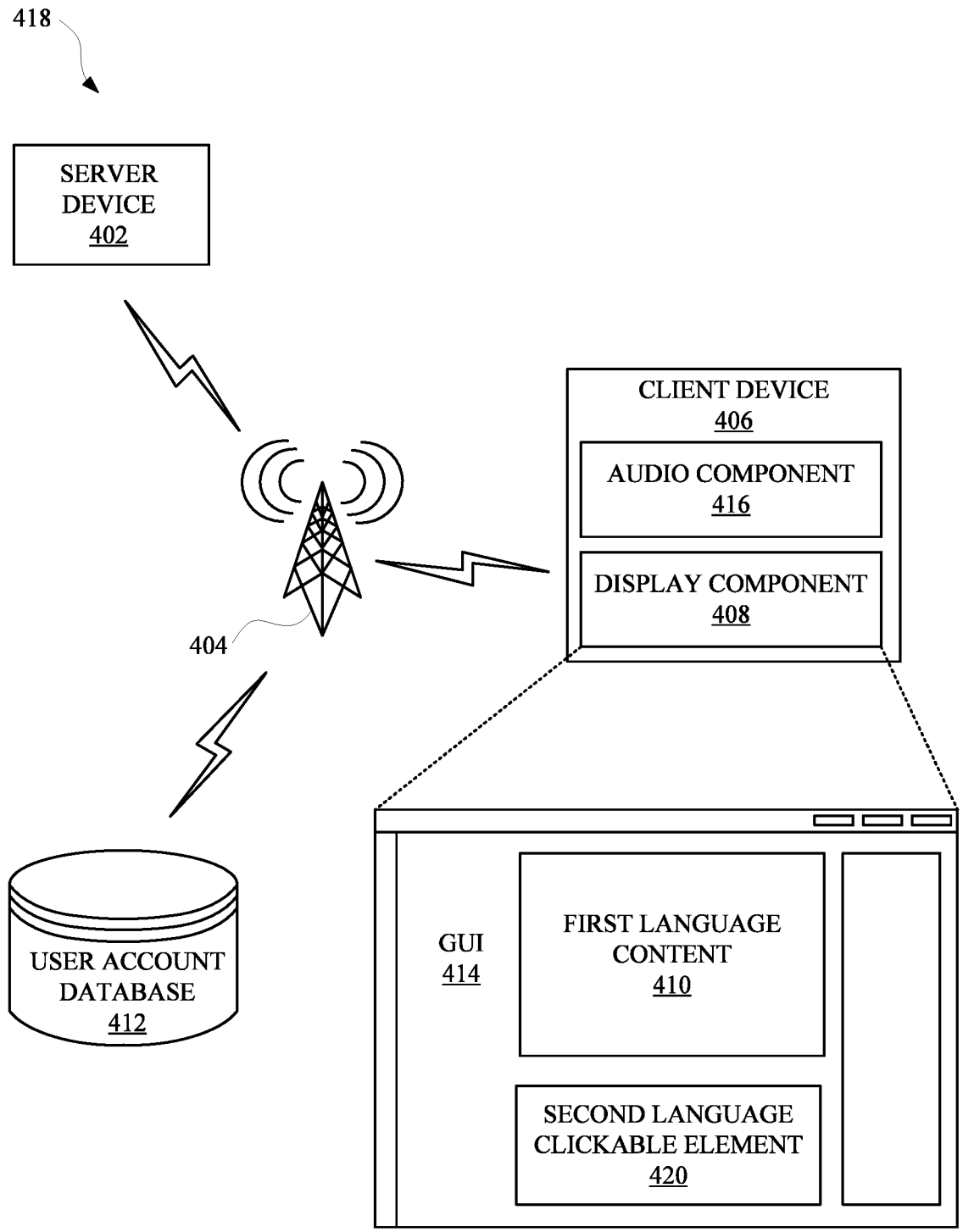

FIGS. 4A and 4B illustrate systems for providing selectable elements that can invoke automated assistants in different languages. Specifically, FIG. 4A illustrates a diagram 400 of a system that includes a server device 402, a client device 406, and a user account database 412 connected over a network 404. The client device 406 can be any computer system 204 capable of displaying content at a display component 408 of the client device 406 in a first language. For example, the display component 408 can include a graphical user interface (GUI) 414 that displays an application having first language content 410. The first language can be English, German, Spanish, French, Japanese, Farsi, and/or any other language that can be spoken or written by a human. The server device 402 can include one or more modules corresponding to one or more automated assistants that can be used to perform functions at the client device 406. A user can communicate with an automated assistant through invocation phrases that can be spoken in a number of different languages. In some implementations, however, the languages understood by the automated assistant can be limited. Therefore, in order to teach the user to solicit the automated assistant in a language understood by the automated assistant, selectable elements can be provided. The selectable elements can be presented in the first language, the language preferred by the user, but the automated assistant can respond in a second language, which the automated assistant understands when audibly spoken by the user. For example, the first language can be German, and the first language content 410 can correspond to a mail application that is being displayed with German text, according to a preference of the user. In order to use the mail application, the user can provide login credentials to the client device 406, which can then transmit the login credentials to the server device 402. The server device 402 can use the login credentials to query the user account database 412 and determine the language preference of the user. If the language preference does not correspond to a language understood by the automated assistant, such as, for example, English, the server device 402 can provide data, corresponding to a selectable element, to the client device 406. The selectable element can include an invocation phrase written in the first language, but, when selected, can cause the automated assistant to speak, from an audio component 416, in a second language to inform the user of how to invoke the automated assistant in the second language.

FIG. 4B provides a diagram 418 that illustrates the selectable element displayed as a second language selectable element 420, which can be used to initialize an automated assistant. In response to the user selecting the second language selectable element 420, the automated assistant can perform a command identified in the second language selectable element 420 and audibly recite the command for the user. For example, while the user is viewing the mail application in German, the second language selectable element 420 can include an invocation phrase that includes the text "Bitte liest du diese email," which can mean "please read this email." The automated assistant can recite the invocation phrase in English, and perform the command (e.g., audibly recite the text of the emails). This can help bilingual users to become aware of the capacity of the automated assistant to understand other languages.

In some implementations, the server device 402 and/or client device 406 can be used to expand a number of spoken invocation phrases that are understood by the automated assistants. The server device 402 can include one or more language processing modules for processing speech of a user, correlating the processed speech to a function of the server device 402 and/or client device 406, correlating application text to a function of the server device 402 and/or client device 406, and/or managing invocation phrases understood by the automated assistants. These modules can be used to expand the number of spoken invocation phrases understood by the automated assistant. For example, a user can view, in a first language, a social network application that includes a GUI with multiple text entries at the client device 406. The client device 406 and/or server device 402 can identify text entries that correlate to a function that can be performed by the automated assistant, such as playing a video that is displayed in the social network application. However, the automated assistant may not understand the first language, and instead may rely on invocation phrases to be provided in a second language. In other words, the automated assistant may already be able to perform the function when the user speaks an invocation phrase in the second language, but not the first language. In this scenario, the user can be provided with a selectable element in the first language, and be prompted to speak an invocation phrase of the selectable element in the first language. The prompt can be included with the selectable element and include the phrase "would you like to record the command in your preferred language?" If the user agrees, the client device 406 and/or the server device 402 can then process the speech received from the user in order to expand the number of invocation phrases the automated assistant is able to understand in the first language. Data related to the processed speech can then be stored in association with the function so that the automated assistant can be invoked to perform the function in either the first language or the second language. Alternatively, the selectable element can cause the automated assistant to recite the invocation phrase of the selectable element in the second language, in order to teach the user how to recite invocation phrases in the language preferred by the automated assistant.

Figure 5:
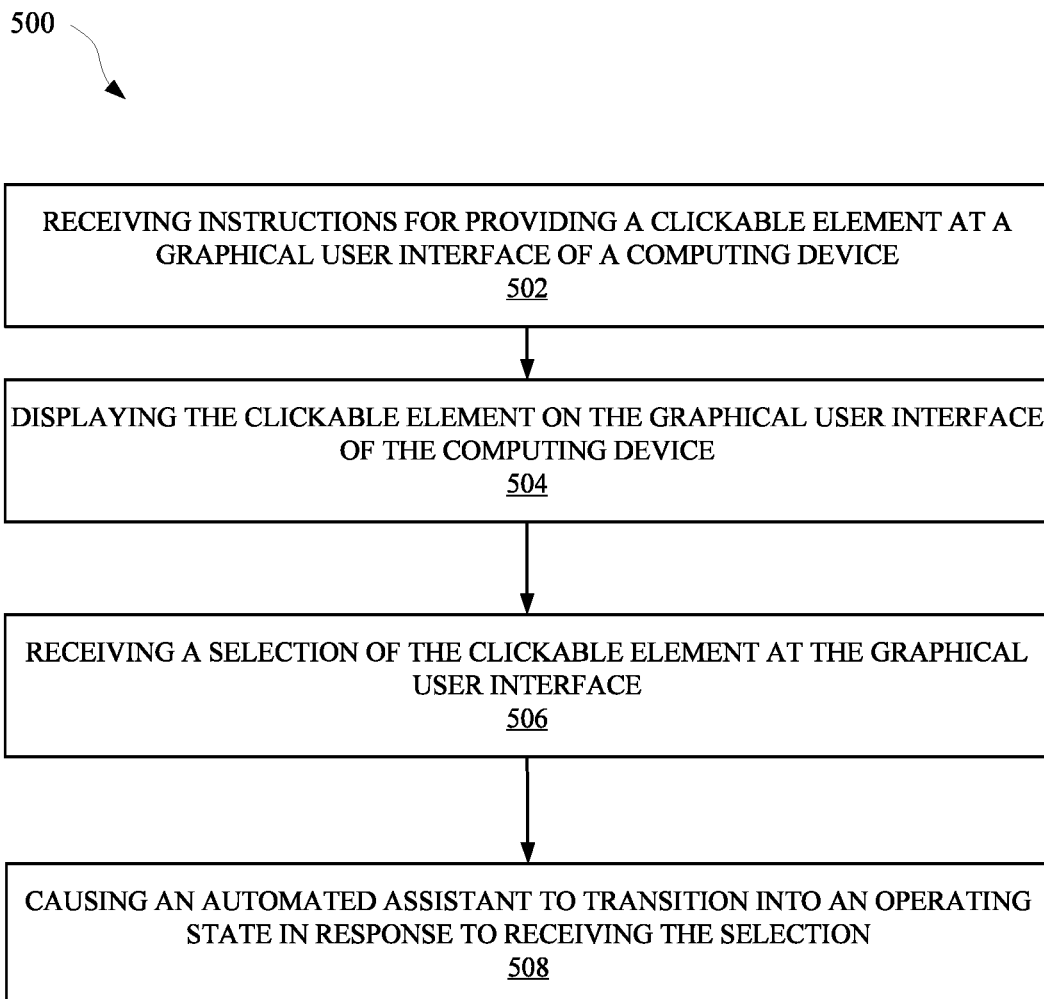
FIG. 5 illustrates a method for initializing an automated assistant from a selectable element.

FIG. 5 illustrates a method 500 for initializing an automated assistant from a selectable element. The method 500 can be performed by a computer system, apparatus, and/or any other device suitable for controlling an automated assistant. The computer system can include various components of various computer systems, including various engines, databases, and modules described herein. Moreover, while operations of method 500 are shown in a particular order, this is not meant to be limiting. One or more operations may be reordered, omitted or added. The method 500 can include a block 502 of receiving instructions for providing a selectable element at a graphical user interface of a computing device. The instructions can be provided by a server device that is connected to the computing device. At block 504, the selectable element can be displayed on the graphical user interface of the computing device. The selectable element can include text corresponding to an invocation phrase for soliciting an automated assistant. The invocation phrase can include a command that can be understood and performed by the automated assistant. For example, the command can direct the automated assistant to perform an action using data stored at the computing device and/or the server device. At block 506, a selection of the selectable element can be received at the graphical user interface. The selection can be made using a touch screen, a keyboard, a touchpad, and/or a peripheral device of the computing device. Furthermore, at block 508, the automated assistant can transition into an operating state in response to receiving the selection. The operating state can be an active operating state where the automated assistant is capable of responding to spoken invocation phrases from a user. Alternatively, the operating state can be an active operating state where the automated assistant performs an action in response to receiving the selection.

Figure 6:
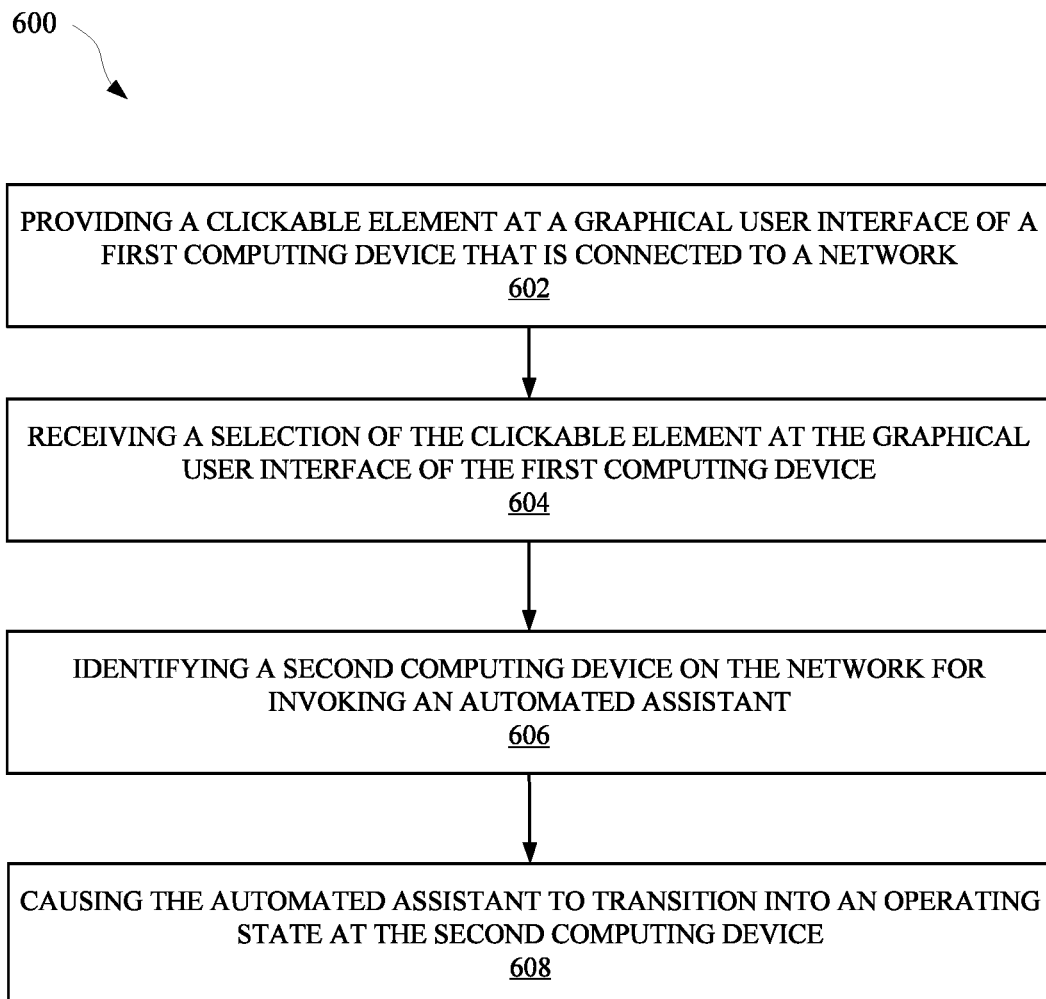
FIG. 6 illustrates a method for initializing an automated assistant at a device different where a selectable element is displayed.

FIG. 6 illustrates a method 600 for initializing an automated assistant at a different computing device from where a selectable element is provided. The method 600 can be performed by a computer system, apparatus, and/or any other device suitable for controlling an automated assistant. The computer system can include various components of various computer systems, including various engines, databases, and modules described herein. Moreover, while operations of method 600 are shown in a particular order, this is not meant to be limiting. One or more operations may be reordered, omitted or added. The method 600 can include a block 602 of providing a selectable element at a graphical user interface of a first computing device that is connected to a network. The selectable element can correspond to a link that can invoke an automated assistant to perform a function identified in text displayed at the selectable element. The method 600 can further include a block 604 of receiving a selection of the selectable element at the graphical user interface of the first computing device. Additionally, the method 600 can include a block 606 of identifying a second computing device on the network for invoking an automated assistant. The second computing device can be identified from a directory of devices that is stored in association with account data of a user. Additionally, the second computing device can be identified based on whether it is more suitable to respond to the selection of the selectable element than the first computing device. For example, if the first computing device is a cellular device, the second computing device is a television, and the selectable element corresponds to a command to play a video, the television can be selected for invoking the automated assistant because it is more suitable for playing videos. Alternatively, if the first computing device is a television, the second computing device is a portable device, and the selectable element corresponds to a command to provide directions, the portable device can be selected for invoking the automated assistant because it can be more readily taken on trips. At block 608, the automated assistant can transition into an operating state at the second computing device. The operating state can be an active operating state where the automated assistant causes an action to be performed at the second computing device. While in the active operating state, the automated assistant can respond to spoken invocation phrases and any subsequent selection of another selectable element.

Figure 7:
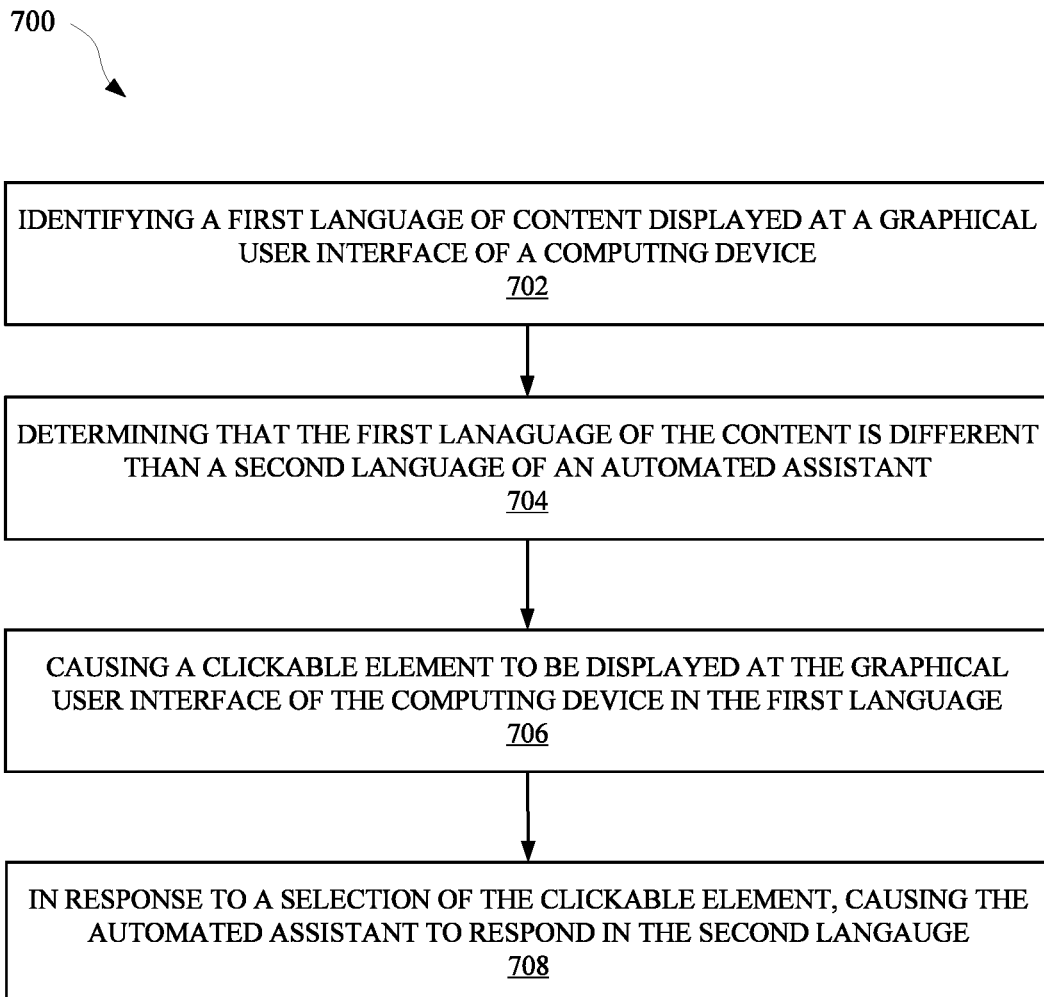
FIG. 7 illustrates a method for initializing an automated assistant that understands a language that is different than a language of content provided at a computing device.

FIG. 7 illustrates a method 700 for initializing an automated assistant that understands a language that is different than a language of content provided at a computing device. The method 700 can be performed by a computer system, server device, apparatus, and/or any other device suitable for controlling an automated assistant. The computer system can include various components of various computer systems, including various engines, databases, and modules described herein. Moreover, while operations of method 700 are shown in a particular order, this is not meant to be limiting. One or more operations may be reordered, omitted or added. The method 700 can include a block 702 of identifying a first language of content displayed at a graphical user interface of a computing device. The first language can correspond to a written language that can be understood by a human, and the content can be provided at an interface of an application that is operating at the computing device. For example, the application can be a calendar application that is displaying content, such as the subject of certain scheduled events, in German. At block 704, the first language is determined to be different than a second language of an automated assistant. The second language can be any language that is different than the first language. For example, the second language can be English, which can be understood by the automated assistant when audibly spoken to a device that is operating the automated assistant. At block 706, a selectable element can be displayed at the graphical user interface of the computing device in the first language. For example, the selectable element can be a button or link that includes text corresponding to an invocation phrase that is provided in the first language. The selectable element can be provided as a user is operating an application having functions that can be controlled by an automated assistant.

For example, if the application is using the calendar application, the selectable element can include a German invocation phrase meaning "please open the calendar for next month." At block 708, in response to a selection of the selectable element, the automated assistant can respond in the second language. In some implementations, the response of the automated assistant can include both the first language and the second language. For example, in the first language, the automated assistant can say "here is how the command is spoken in the second language," and subsequently, in the second language, the automated assistant can speak the invocation phrase. In this way, the user can be encouraged to speak invocation phrases in the language that is preferred by the automated assistant.

Figure 8:
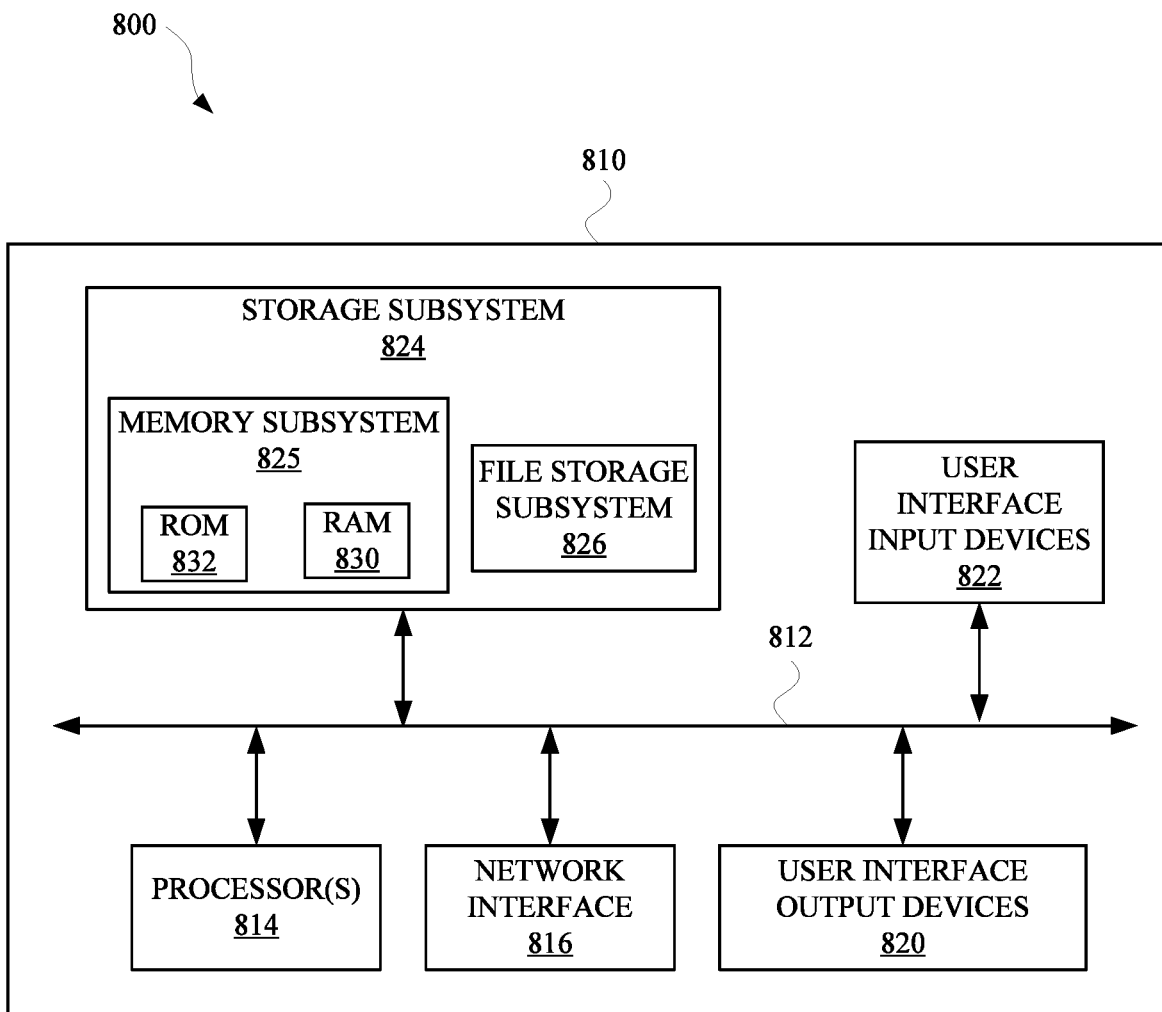
FIG. 8 illustrates is a block diagram of an example computer system.

FIG. 8 is a block diagram 800 of an example computer system 810. Computer system 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 can include the logic to perform selected aspects of methods 500, 600, 700, and/or to implement one or more of the server devices, client devices, databases, engines, and/or modules discussed herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   receiving, by a server device, an indication of a user selection of a selectable element rendered at a graphical user interface of a first computing device,
   wherein the selectable element is rendered at the graphical user interface of the first computing device while an application is executing at the first computing device, and
   wherein the selectable element is rendered at the graphical user interface with a command phrase that includes natural language content, which, when provided as a spoken input by a user to an automated assistant interface, prior to the selectable element being rendered at the graphical user interface of the first computing device, transitions an automated assistant into an operating state in which the automated assistant causes an operation associated with the application to be performed; and
   in response to receiving the indication of the user selection of the selectable element:
      identifying multiple computing devices associated with an account of the user associated with the first computing device, wherein the multiple computing devices include at least the first computing device and one or more additional computing devices;
      selecting a particular computing device of the one or more additional computing devices for initializing the automated assistant, from among the multiple computing devices, based on the operation associated with the application that is to be performed; and
      causing, in response to the selection of the selectable element and based on selecting the particular computing device, the automated assistant to:
         initialize at the automated assistant interface of the particular computing device,
         perform the operation associated with the application,
         transition into a state in which the automated assistant monitors, at the automated assistant interface of the particular computing device, for one or more additional spoken utterances of the user at the automated assistant interface of the particular computing device, and
         provide one or more additional selectable elements at the automated assistant interface of the particular computing device, the one or more additional selectable elements being selectable by the user to cause the automated assistant at the automated assistant interface of the particular computing device to perform one or more additional operations associated with the application.

2. The computer-implemented method of claim 1, further comprising:
   providing, to the server device, credentials of the user; and
   receiving, from the server device and based on the credentials of the user, a directory of computing devices associated with the user, wherein the directory identifies the one or more additional computing devices.

3. The computer-implemented method of claim 1, further comprising: causing the first computing device or the particular computing device to audibly render the command phrase.

4. The computer-implemented method of claim 1, wherein the command phrase has not been previously submitted by user via any spoken input to the automated assistant.

5. The computer-implemented method of claim 4, further comprising:
   providing, to the server device, data that identifies application content previously displayed at the graphical user interface while the application is executing and prior to rendering the command phrase with the selectable element, wherein at least a portion of the command phrase describes the previously displayed application content.

6. The computer-implemented method of claim 1, wherein the server device causes the selectable element to be rendered based on data associated with an account profile of the user.

7. The computer-implemented method of claim 6, wherein the operation associated with the application is performed using a particular value for a parameter, and wherein the server device determines the particular value for the parameter based on a frequency that the user has previously used the application to perform the operation using the particular value for the parameter.

8. A system comprising:
   memory and one or more processors, the memory storing instructions that, when executed by the one or more processors, cause the one or more processors to:
   receive, by a server device, an indication of a user selection of a selectable element rendered at a graphical user interface of a first computing device,
      wherein the selectable element is rendered at the graphical user interface of the first computing device while an application is executing at the first computing device, and
      wherein the selectable element is rendered at the graphical user interface with a command phrase that includes natural language content, which, when provided as a spoken input by a user to an automated assistant interface, prior to the selectable element being rendered at the graphical user interface of the first computing device, transitions an automated assistant into an operating state in which the automated assistant causes an operation associated with the application to be performed; and
   in response to receiving the indication of the user selection of the selectable element:
      identify multiple computing devices associated with an account of the user associated with the first computing device, wherein the multiple computing devices include at least the first computing device and one or more additional computing devices;
      select a particular computing device of the one or more additional computing devices for initializing the automated assistant, from among the multiple computing devices, based on the operation associated with the application that is to be performed; and
      cause, in response to the selection of the selectable element and based on selecting the particular computing device, the automated assistant to:
         initialize at the automated assistant interface of the particular computing device,
         perform the operation associated with the application, transition into a state in which the automated assistant monitors, at the automated assistant interface of the particular computing device, for one or more additional spoken utterances of the user at the automated assistant interface of the particular computing device, and provide one or more additional selectable elements at the automated assistant interface of the particular computing device, the one or more additional selectable elements being selectable by the user to cause the automated assistant at the automated assistant interface of the particular computing device to perform one or more additional operations associated with the application.

9. The system of claim 8, further comprising instructions that, when executed by the one or more processors, cause the one or more processors to:

provide, to the server device, credentials of the user; and
receive, from the server device and based on the credentials of the user, a directory of computing devices associated with the user, wherein the directory identifies the one or more additional computing devices.

10. The system of claim 8, further comprising: causing the first computing device or the particular computing device to audibly render the command phrase.

11. The system of claim 8, wherein the command phrase has not been previously submitted by user via any spoken input to the automated assistant.

12. The system of claim 11, further comprising instructions that, when executed by the one or more processors, cause the one or more processors to: provide, to the server device, data that identifies application content previously displayed at the graphical user interface while the application is executing and prior to rendering the command phrase with the selectable element, wherein at least a portion of the command phrase describes the previously displayed application content.

13. The system of claim 8, wherein the server device causes the selectable element to be rendered based on data associated with an account profile of the user.

14. The system of claim 13, wherein the operation associated with the application is performed using a particular value for a parameter, and wherein the server device determines the particular value for the parameter based on a frequency that the user has previously used the application to perform the operation using the particular value for the parameter.

15. At least one non-transitory computer-readable medium comprising instructions that, in response to execution of the instructions by one or more processors, cause the one or more processors to perform the following operations:

receive, by a server device, an indication of a user selection of a selectable element rendered at a graphical user interface of a first computing device,
wherein the selectable element is rendered at the graphical user interface of the first computing device while an application is executing at the first computing device, and
wherein the selectable element is rendered at the graphical user interface with a command phrase that includes natural language content, which, when provided as a spoken input by a user to an automated assistant interface, prior to the selectable element being rendered at the graphical user interface of the first computing device, transitions an automated assistant into an operating state in which the automated assistant causes an operation associated with the application to be performed; and in response to receiving the indication of the user selection of the selectable element:
identify multiple computing devices associated with an account of the user associated with the first computing device, wherein the multiple computing devices include at least the first computing device and one or more additional computing devices;
select a particular computing device of the one or more additional computing devices for initializing the automated assistant, from among the multiple computing devices, based on the operation associated with the application that is to be performed; and
cause, in response to the selection of the selectable element and based on selecting the particular computing device, the automated assistant to:
initialize at the automated assistant interface of the particular computing device,
perform the operation associated with the application,
transition into a state in which the automated assistant monitors, at the automated assistant interface of the particular computing device, for one or more additional spoken utterances of the user at the automated assistant interface of the particular computing device, and
provide one or more additional selectable elements at the automated assistant interface of the particular computing device, the one or more additional selectable elements being selectable by the user to cause the automated assistant at the automated assistant interface of the particular computing device to perform one or more additional operations associated with the application.

16. The at least one non-transitory computer-readable medium of claim 15, further comprising instructions that, when executed by the one or more processors, cause the one or more processors to:

provide, to the server device, credentials of the user; and
receive, from the server device and based on the credentials of the user, a directory of computing devices associated with the user, wherein the directory identifies the one or more additional computing devices.

17. The at least one non-transitory computer-readable medium of claim 15, further comprising: causing the first computing device or the particular computing device to audibly render the command phrase.

18. The at least one non-transitory computer-readable medium of claim 15, wherein the command phrase has not been previously submitted by user via any spoken input to the automated assistant.

19. The at least one non-transitory computer-readable medium of claim 18, further comprising instructions that, when executed by the one or more processors, cause the one or more processors to:

provide, to the server device, data that identifies application content previously displayed at the graphical user interface while the application is executing and prior to rendering the command phrase with the selectable element, wherein at least a portion of the command phrase describes the previously displayed application content.

20. The at least one non-transitory computer-readable medium of claim 15, wherein the server device causes the selectable element to be rendered based on data associated with an account profile of the user.

\* \* \* \* \*